(12) United States Patent
Hersam et al.

(10) Patent No.: US 7,705,617 B1
(45) Date of Patent: Apr. 27, 2010

(54) BRIDGE-ENHANCED NANOSCALE IMPEDANCE MICROSCOPY

(75) Inventors: Mark C. Hersam, Evanston, IL (US); Liam S. C. Pingree, Chicago, IL (US)

(73) Assignee: Northwestern University, Evanston, IL (US)

( * ) Notice: Subject to any disclaimer, the term of this patent is extended or adjusted under 35 U.S.C. 154(b) by 157 days.

(21) Appl. No.: 11/490,592

(22) Filed: Jul. 21, 2006

Related U.S. Application Data

(60) Provisional application No. 60/701,286, filed on Jul. 21, 2005.

(51) Int. Cl.
*G01R 31/26* (2006.01)
*G01R 17/10* (2006.01)

(52) U.S. Cl. .................. 324/719; 324/724; 324/725; 977/863; 977/881

(58) Field of Classification Search ............... 324/719, 324/722, 724, 725
See application file for complete search history.

(56) References Cited

U.S. PATENT DOCUMENTS

| | | | |
|---|---|---|---|
| 5,874,734 A * | 2/1999 | Elings et al. ............... 250/306 |
| 6,975,129 B2 * | 12/2005 | Chang ....................... 324/762 |
| 7,093,509 B2 * | 8/2006 | Shao et al. ................... 73/105 |
| 7,193,424 B2 * | 3/2007 | Chang ....................... 324/762 |
| 2003/0067308 A1 * | 4/2003 | Bonnell et al. ............. 324/662 |
| 2005/0150280 A1 * | 7/2005 | Tang et al. ................... 73/105 |

* cited by examiner

*Primary Examiner*—Timothy J Dole
(74) *Attorney, Agent, or Firm*—Reinhart Boerner Van Deuren s.c.

(57) ABSTRACT

Nanoscale impedance microscopy and related methods, circuit and/or apparatus capable of quantitatively measuring magnitude and phase of alternating current flow.

18 Claims, 10 Drawing Sheets

Figure 1A
Figure 1B
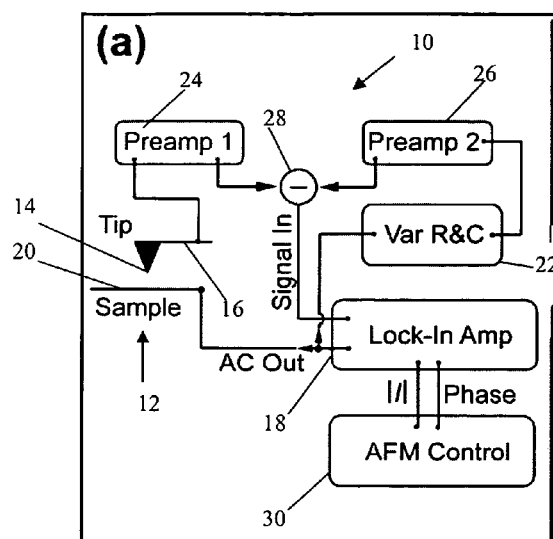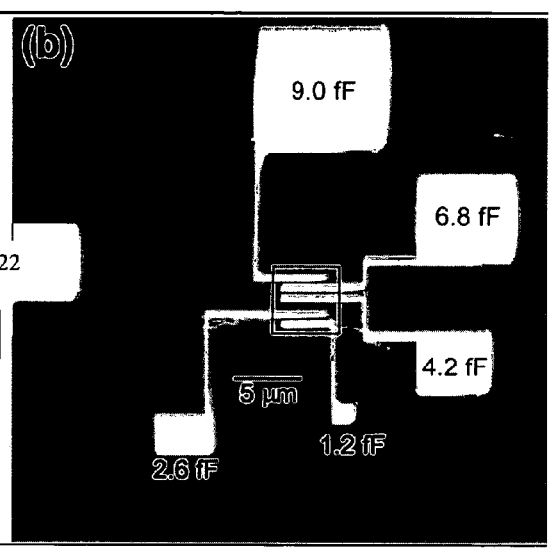

BRIDGE-ENHANCED NANOSCALE IMPEDANCE MICROSCOPY

This application claims priority benefit from application Ser. No. 60/701,286, filed on Jul. 21, 2005, the entirety of which is incorporated herein by reference.

The United States Government has certain rights to this invention pursuant to Grant No. NCC 2-1363 from the National Aeronautics and Space Administration, and Grant Nos. DMR-0134706 and CMS-0304472 from the National Science Foundation, to Northwestern University.

BACKGROUND OF THE INVENTION

For decades, macroscopic impedance spectroscopy techniques have characterized alternating current (AC) charge transport for a variety of materials systems and devices. Subsequent modeling of this frequency dependent behavior has revealed underlying electrolytic surface reactions, doping levels of semiconductors, the properties of interfaces in organic and inorganic multilayer devices, and charge transport in percolation network systems. However, these macroscopic methods only reveal an ensemble average of the underlying contributions of individual pathways, defects, film thickness variations, electrochemical reactions, and failure mechanisms. To probe these effects with higher spatial resolution, a series of noncontact scanning probe impedance measurement techniques have been developed, such as scanning capacitance microscopy, scanning capacitance spectroscopy, and scanning impedance microscopy. These strategies sense relatively long-range electrostatic interactions between the probe and the sample with spatial resolution on the order of 50 nm.

However, such techniques can be limited. For instance, in scanning capacitance microscopy, a non-contact mode technique, long-range tip-sample interactions contribute to the overall signal, and the topography and capacitance signals are completely convolved and cannot be separated. Scanning capacitance spectroscopy, another non-contact mode approach, is likewise hindered and can require a data collect period approaching 24 hours. Scanning impedance microscopy is another non-contact technique, also providing convolved topography and capacitance signals. To deconvolute such modulations, a two-paths method is employed: in the first scan, the topography information is gathered in tapping mode; on the second pass, the tip is lifted and held at a constant distance from the sample by re-tracing the topography data. During the second pass, the phase shift signal is recorded. Of course, a 2-pass method to gather data takes twice as long. Even so, spatial resolution is limited due to long-range electrostatic interactions with a sample surface. (See, e.g., U.S. Pat. No. 6,873,163, the entirety of which is incorporated herein by reference.)

As a result, the search for improved sensitivity and optimal spatial resolution has been an ongoing concern in the art. One approach toward quantitative measurement of chemically and electrically active components is Nanoscale Impedance Microscopy (NIM), together with associated Atomic Force Microscopy (AFM) techniques. Atomic force microscopy is described generally in U.S. Pat. No. 6,642,517, the entirety of which—and, in particular, FIGS. 1-2, 4 and 6-7 and corresponding descriptions thereof and the references cited therein—is incorporated herein by reference. More specifically, conductive atomic force microscopy (cAFM) has recently proven to be an effective method for probing current flow and resistivity variations with nanometer scale spatial resolution in gold nanowires, silicon field effect transistors, individual organic molecules, conducting polymer blends, and emissive polymers. See, respectively: M. C. Hersam, A. C. F. Hoole, S. J. O'Shea, and M. E. Welland, *Appl. Phys. Lett.* 72, 915 (1998); P. De Wolf, W. Vandervorst, H. Smith, and N. Khalil, *J. Vac. Sci. Technol. B* 18, 540 (2000); A. M. Rawlett, T. J. Hopson, L. A. Nagahara, R. K. Tsui, G. K. Ramachandran, and S. M. Lindsay, *Appl. Phys. Lett.* 81, 3043 (2002); J. Planès, F. Houzé, P. Chrétien, and O. Schneegans, *Appl. Phys. Lett.* 79, 2993 (2001); and H.-N. Lin, H.-L. Lin, S.-S. Wang, L.-S. Yu, G.-Y. Perng, S.-A. Chen, and S.-H. Chen, *Appl. Phys. Lett.* 81, 2572 (2002). cAFM is described generally in U.S. Pat. No. 5,874,734, the entirety of which is also incorporated hereby by reference.

In NIM, a cAFM probe is placed in direct contact with a sample. Subsequently, an AC bias is applied to the sample, and the resulting magnitude and phase of the current at the driving frequency are monitored with either a commercial impedance analyzer or a lock-in amplifier (LIA). In this manner, NIM can provide 10 nm spatial resolution maps of impedance variations. To date, this technique has probed AC charge transport across individual grain boundaries, local variations in polymer film impedance, and the frequency dependent performance of nanoelectronic devices. Common to all reports on NIM, however, is the detection limit imposed by the fringe capacitance between the sample and the conductive probe/cantilever. Reports of fringe capacitance, which acts in parallel with the tip/sample junction, have ranged from 1-100 pF, as confirmed in reports for micro- and nanoscaled ferroelectric capacitors.

SUMMARY OF THE INVENTION

In light of the foregoing, it is an object of the present invention to provide one or more methods and/or apparatus for use in conjunction therewith to spatially-resolve and quantitatively measure a range of chemically and/or electrically-active components on the nanoscale, thereby overcoming various deficiencies and shortcomings of the prior art, including those outlined above. It will be understood by those skilled in the art that one or more aspects of this invention can meet certain objectives, while one or more other aspects can meet certain other objective. Each objective may not apply equally, in all of its respects, to every aspect of this invention. As such, the following objects can be viewed in the alternative with respect to any one aspect of this invention.

It is an object of the present invention to provide a method and/or apparatus to enhance the benefits associated with nanoscale impedance microscopy, as can be achieved by improving detection limits and/or spatial resolution.

It is another object of the present invention to provide a method(s), and one or more apparatus useful therewith, to reconcile fringe capacitance contribution to current flow and resulting impedance measurement.

It can be another object of the present invention to provide one or more apparatus, component configurations and/or associated circuitry useful in the implementation of such methods, such apparatus, components and/or circuitry readily available and incorporated into current commercial atomic force microscopy systems.

It can also be an object of the present invention, alone or in conjunction with one or more of the preceding objectives, to provide a method and/or apparatus for high-resolution, accurate and quantitative mapping of spatial variations in real sample capacitance, as compared to conventional impedance measurement techniques of the prior art.

Other objects, features, benefits and advantages of this invention will be apparent from the summary, in conjunction with the following descriptions of certain embodiments, and will be readily apparent to those skilled in the art having knowledge of various conductive atomic force microscopy techniques and their implementation in the area of nanoscale impedance microscopy. Such objects, features, benefits and advantages will be apparent from the above as taken into conjunction with the accompanying examples, data, figures and all reasonable inferences to be drawn there from, alone or with consideration of the references incorporated herein.

In part, this invention can be directed to a method for spatially-resolving nanoscale impedance variations. Such a method can comprise providing a conductive atomic force microscope apparatus comprising a probe positionable to contact a sample component; bridging an AC bias applied across the sample component to determine impedance of the sample; and correlating impedance with sample contact position. In certain embodiments, the conductive probe of such an apparatus can be at a fixed position on a sample component, to detect current magnitude and/or phase. Various other embodiments, a sample component can be scanned with an applied bias, for topographical mapping. Alternatively, in such embodiments, capacitance, current magnitude and phase can be mapped simultaneously with sample topography. As described more fully below, a bridge or bridging aspect of this invention can be used to greatly improve the spatial resolution of any such parameter or topographical feature.

As would be understood by those skilled in the art made aware of this invention, the term bridge, bridging or a variation thereof, as used herein, refers to one or more circuit components and/or procedures functionally operative to assess or determine contribution to the probe/sample current caused or induced by fringe capacitance or a related such phenomenon, nulling or canceling such factor(s) and negating, referring to or otherwise accounting for such a contribution in the determination of a sample impedance. In certain embodiments, bridging can comprise analog circuitry. Without limitation, a first portion of an AC bias can be directed to a sample component with a second portion of the AC bias directed to a varied impedance circuit comprising resistor and capacitor components. Differential voltage outputs corresponding to each such directed AC bias portion can be assessed, to provide a DC signal proportional to the difference between the voltage outputs. Prior to sample contact or scanning, the resistor/capacitor circuit can be varied to provide a zero differential in phase and magnitude of each voltage output, to balance the bridge and cancel fringe capacitance contribution to the resulting signal.

In certain other embodiments, bridging can be digital. As described more fully below, such an approach can comprise determination of phase and current magnitude values of an applied AC bias, with determination of phase and current magnitude values of a fringe capacitance contribution to the applied AC bias over a frequency range. As with an analog embodiment, balance of a digital circuit can be achieved by separating the probe from a sample component surface.

In certain other embodiments, such a method can comprise providing a conductive atomic force microscope apparatus comprising a probe positionable to contact a sample component; providing a bridge circuit across the sample; determining a reference impedance for the bridge circuit; applying an AC bias across the sample; and correlating sample impedance with probe position. As discussed above and illustrated more fully below, an impedance reference determination can comprise determining current magnitude and phase values of an applied AC bias, and determining current magnitude and phase values of a fringe capacitance contribution to the applied AC bias. Such a bridge circuit can be selected from digital circuitry and analog circuitry.

In part, this invention can also be directed to a method of using a bridge to affect fringe capacitance contribution to AC current bias across a sample. Such a method can comprise providing a conductive atomic force microscope apparatus comprising a probe positionably contacting a sample component; bridging an AC bias applied across the sample component, with a resistance and a capacitance sufficient to counter fringe capacitance; and correlating impedance with sample contact position, without contribution from fringe capacitance between the microscope tip and sample component. As mentioned above, such bridging can be digital or comprise analog circuitry. Regardless, circuit balance can be achieved prior to scanning or data accumulation, by separating a probe tip from the surface of a sample component.

In part, this invention can also be directed to an impedance microscopy system for nanoscale resolution of impedance variations. Such a system can comprise a conductive atomic force microscope apparatus comprising circuitry capable of canceling fringe capacitance about a cantilever tip of the apparatus, the circuitry comprising at least one current amplifier coupled to a lock-in amplifier. As would be understood by those skilled in the art, a lock-in amplifier can measure an AC voltage (or current) and provide an output in the form of a DC voltage proportional to the value of the AC signal being measured. An amplification aspect can be introduced as the DC level at output can be greater than the AC level at input. Regardless, such apparatus can comprise circuitry for digital or analog bridging to address and/or account for fringe capacitance contribution to the resulting signal.

In certain embodiments, such a bridge can be digital and comprise one current amplifier having an input coupled to the cantilever tip, and an output coupled to a lock-in amplifier. In certain other embodiments, an analog circuit can comprise a first current amplifier coupled to the cantilever tip, and a variable impedance component, comprising resistor and capacitor components, coupled to a second current amplifier, with the first and second amplifiers coupled to a differential amplifier and to the lock-in amplifier. Regardless, whether digital or analog circuitry, the lock-in amplifier component can be coupled to an atomic force microscope control component, to correlate cantilever tip location with impedance for spatial mapping of a sample.

BRIEF DESCRIPTION OF THE DRAWINGS

FIGS. 1A-B Configuration/circuit diagram for a representative BE-NIM embodiment of this invention. (B) AFM topography electronic image of the MOS test structures. The calculated capacitance values have been overlaid on the image. The box drawn on the image corresponds to the region that is imaged in FIG. 2.

DETAILED DESCRIPTION OF CERTAIN EMBODIMENTS

Figure 2A:
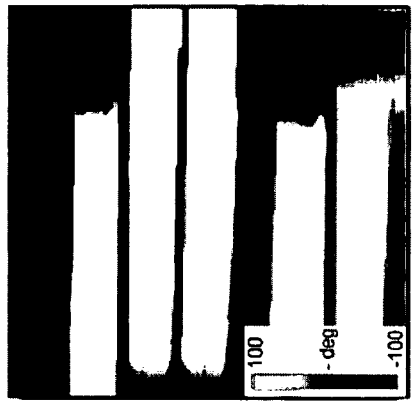
FIGS. 2A-F. 7 μm×7 μm BE-NIM topography (A), magnitude (B) and phase (C) electronic images of gold electrode sample (FIG. 1B) gathered at 2 kHz and 750 mV$_{RMS}$ oscillation magnitude with a +3 VDC offset. (D-F) 7 μm×7 μm topography (D), magnitude (E) and phase (F) images of the same electrode set gathered by NIM at identical driving conditions.

As discussed above, the present invention provides a cAFM technique capable of quantitatively measuring the magnitude and phase of alternating current flow through the tip/sample junction with a five order of magnitude improvement in sensitivity. Bridge enhanced nanoscale impedance microscopy (BE-NIM), a term as can be used with regard to certain aspects of this invention, can use a tunable, variable resistor/capacitor bridge circuit to null the spurious contribution to the tip/sample current caused by fringe capacitance between the cAFM cantilever and the sample. As discussed below, illustrating certain features, BE-NIM can be used to characterize an array of electron beam lithographically patterned metal-oxide-semiconductor capacitors, and shown to compare favorably to conventional NIM. In addition, the broad applicability of BE-NIM is demonstrated for a multi-walled carbon nanotube/poly(m-phenylenevinylene-co-2,5-dioctyloxy-p-phenylenevinylene) nanocomposite material, on which the alternating current behavior of individual nanoscale conductive pathways is quantitatively probed.

The ability of this invention to spatially resolve quantitative current magnitude and phase shift values in materials with 10 nm precision is advantageous, since previously available techniques to quantitatively measure similar data have only provided millimeter scale spatial resolution (6 orders of magnitude larger in size). Furthermore, this invention is capable of quantitatively measuring frequency dependent electronic behavior of conductive pathways with capacitances on the order of 100 aF ($10^{-18}$ farads), whereas prior quantitative detection methods of both phase and magnitude with such spatial resolution have been limited to capacitance values 5 orders of magnitude larger—i.e., 10 pF ($10^{-12}$ farads).

A schematic block diagram of a representative BE-NIM system 10 is illustrated in FIG. 1(A). Measurement can be taken under ambient conditions, using a commercially-available cAFM, modified as described herein. More specifically, a conventional cantilever beam deflection component detects deflection of a probe assembly as a conducting tip interacts with a sample surface. System 10 includes a laser for directing the beam of light toward the cantilever which, during operation, reflects the laser toward photodetector 20. As understood in the art, system 10 then measures the position of the defective light beam which is indicative of the deflection of cantilever 16 which, in turn, is a measure of the reaction force between the tip and the sample surface. Scanning can be accomplished with, for instance, a ThermoMicroscopes CP Research atomic force microscope 12 in ambient conditions. All cAFM measurements are made with Nanosensors boron-doped diamond-coated silicon tips 14 and cantilevers 16 (e.g., Model No. CDT-FMR). Diamondcoated probes are chosen to minimize tip wear during contact mode imaging.

The AC bias originates from a lock-in amplifier (LIA) 18 (e.g., Stanford Research Systems SR 850 DSP LIA) and is subsequently split. One branch of the AC bias is sent directly to sample 20, and the second branch is passed through a tunable impedance (resistor-capacitor, RC) circuit 22. The current through the tip/sample junction and the variable RC circuit are monitored via independent current preamplifiers (e.g., DL Instruments LLC 1212) 24 and 26, respectively. The voltage outputs from the two preamplifiers serve as the inputs to a differential amplifier 28, with the resulting difference signal then returned to the LIA. The magnitude and phase outputs of the LIA are subsequently monitored by the AFM control electronics 30, thus enabling correlation with the probe location for spatial mapping of the sample impedance.

The variable RC circuit can null the spurious contribution to the NIM signals caused by the fringe capacitance. In order to balance this electrical bridge, the probe or tip can be brought into contact with a nonactive region of the sample (if one exists), or lifted just out of contact with the surface. The resistor and capacitor are then tuned so that both the magnitude and phase of the signal received by the LIA are zero. Following such a nulling procedure, contact mode cAFM scanning is commenced.

The aforementioned circuit and apparatus components are non-limiting with respect to the methods, apparatus and/or systems of this invention. As would be understood by those skilled in the art, various other apparatus and/or circuit components are available, limited only by results achieved in accordance herewith. For instance, various other circuit and/or component configurations can be used to achieve the bridging effect described herein. Likewise, various other microscope and/or detection components can be used with comparable effect. For instance, an AFM apparatus useful in conjunction with this invention is not limited to optical beam-bounce component(s), but could also employ piezo cantilevers known in the art and suitable for such conductive AFM technologies.

To demonstrate the sensitivity and spatial resolution of BE-NIM, a series of five 25 nm tall by 750 nm wide gold electrodes were patterned by electron-beam lithography on a 500 nm thick silicon oxide grown on n-type silicon (1-10 Ω/cm, Siliconquest). These electrodes are connected to micron-sized gold squares. The sizes and capacitances of these metal-oxide-semiconductor (MOS) structures are shown in the AFM topography image of FIG. 1(B), where the capacitance values were calculated using three-dimensional considerations. (T. Sakurai and K Tamaru, IEEE Trans. Electron Devices 30, 183 (1983).)

Figure 2B:
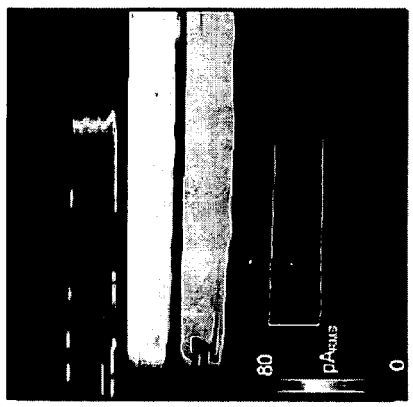
Figure 2C:
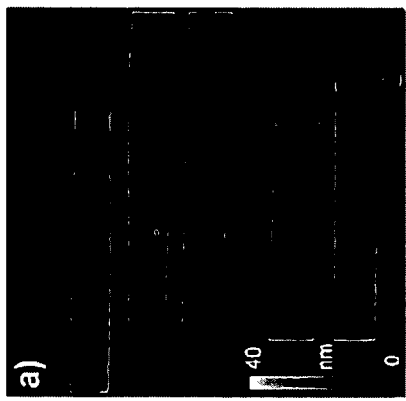

The electrodes were imaged at a 0.25 Hz scan rate with a contact force of 70 nN. A 2 kHz, 150 mV$_{rms}$ signal was applied to the underlying silicon substrate. To avoid depletion effects in the underlying silicon, the MOS capacitors were placed in the accumulation regime by applying an additional −3 V dc offset bias to the silicon substrate with respect to the grounded tip. The resulting topography, magnitude, and phase images are shown in FIGS. 2(A)-2(C). It should be noted that when the bridge is tuned properly and the tip is located off of the MOS capacitors, the LIA receives a nulled input signal and, consequently, outputs a spurious phase shift signal due to residual electrical noise. To alleviate confusion from this inconsequential effect, the phase signal was disregarded for all image pixels when the current magnitude fell below a minimum threshold value of 1 pA.

To verify the accuracy of the BE-NIM data, theoretical values for the current magnitude, |I|, were calculated using the following equation from elementary circuit theory: $|I|=2\pi fC|V|$, where f is the frequency, C is the capacitance, and |V| is the magnitude of the applied bias. Furthermore, the current flowing though a purely capacitive circuit is expected to be −90° out of phase with respect to the applied voltage waveform. Table I directly compares the calculated and measured values of the current from FIGS. 2A-2B. Excellent agreement is seen for the current magnitude and phase, thus quantifying the performance of BE-NIM on these test structures.

TABLE I

Comparison between measured and calculated currents for the MOS test structures shown in FIGS. 1 and 2.

| Capacitance (fF) | \|I\| Measured (pArms) | \|I\| Calculated (pArms) | Measured phase shift (degrees) |
|---|---|---|---|
| 9.0 | 16.2 | 16.9 | −90 |
| 6.8 | 11.7 | 12.7 | −90 |
| 4.2 | 7.7 | 8.0 | −90 |
| 2.6 | 4.8 | 4.9 | −90 |
| 1.2 | 2.0 | 2.2 | −85 |

Figure 2D:
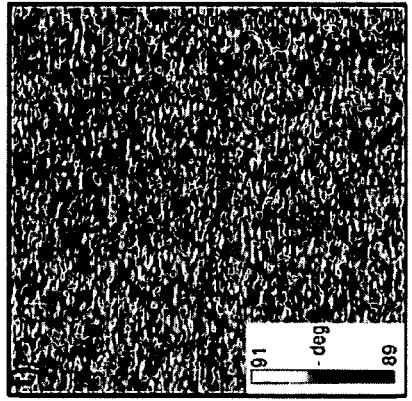
Figure 2E:
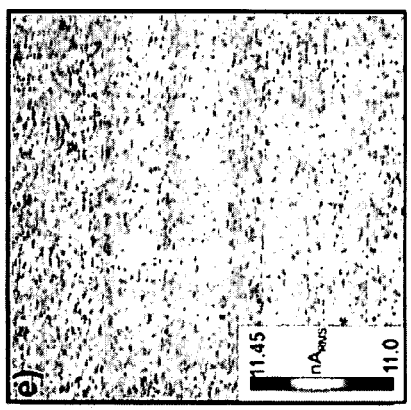
Figure 2F:
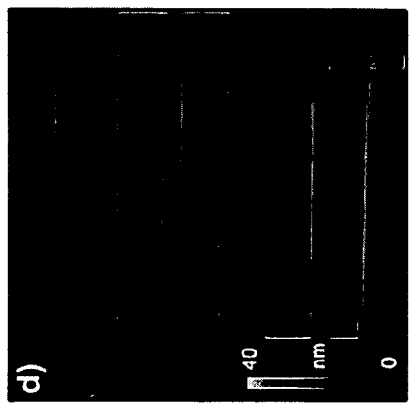
Figure 3A:
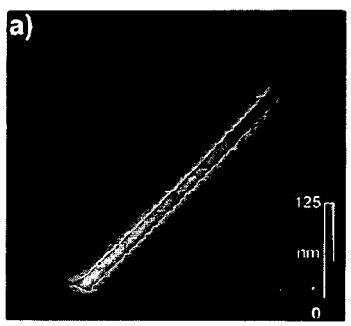
FIGS. 3A-F. 6 μm×6 μm BE-NIM topography (A), magnitude (B) and phase (C) electronic images of a MWNT/PmPV hybrid film spun-cast onto a gold electrode. Images were acquired at 10 kHz and 750 mV$_{RMS}$ oscillation magnitude. (D-F) 6 μm×6 μm topography (D), magnitude (E) and phase (F) images of the same region gathered by NIM at identical driving conditions.
Figure 3B:
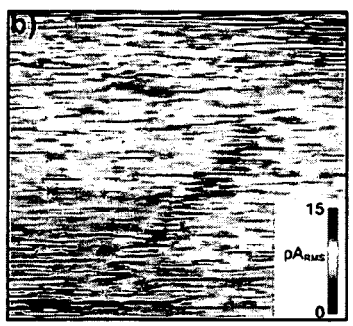
Figure 3C:
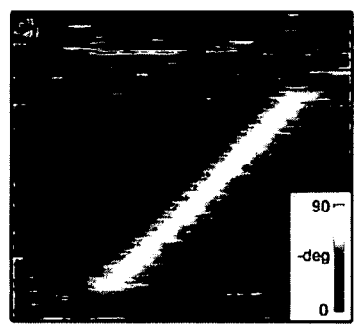
Figure 3D:
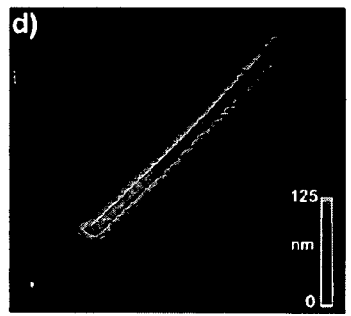
Figure 3E:
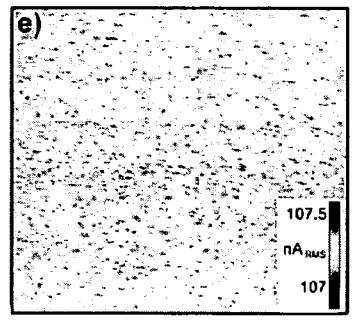
Figure 3F:
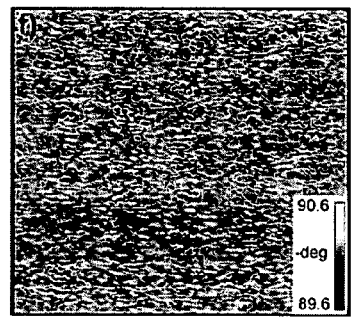

In contrast to this set of images (2A-C), the same region was imaged using the standard NIM approach, as seen in FIGS. 2D-2F. Here, the contribution of the 1.2 pF fringe capacitance dominates the NIM signal, as evident by the 2.2 nA$_{rms}$ current magnitude and −90° phase shift in the background. Slight contrast in the magnitude image (FIG. 2E) is only visible on the largest capacitance structures since the two capacitors ($C_{sample}$ and $C_{fringe}$) in parallel have an additive contribution to the magnitude of the current which flows through them. A comparison of the phase images (FIGS. 2C and 2F) from the two techniques further reveals the strengths of BE-NIM. In prior art NIM, when the sample impedance is high, the current due to fringe capacitance is the dominant contribution to the signal, and the phase shift will only reflect that of the fringe capacitance. Consequently, unlike the BE-NIM image of FIG. 2C, no spatially resolved contrast is observed in the NIM image of FIG. 2F.

Previous work proposed that the phase shift will only be accurately recorded in NIM when the contribution to the AC current flow from the sample exceeds the fringe contribution by a factor of greater than 100 (i.e., $I_{sample}/I_{fringe} > 100$); that is, the phase signal is corrupted by the contribution of fringe capacitance of the ratio <100. See, L. S. C. Pingree, E. F. Martin, K. R. Shull, and M. C. Hersam, IEEE Trans. Nano. 4, 255 (2005). From FIG. 2, however, it is apparent that BE-NIM is capable of accurately recording phase shifts even when $I_{sample}/I_{fringe} = 0.001$, thus demonstrating that a BE-NIM method and/or system of this invention enables a five order of magnitude improvement over the detection limit of NIM.

With improved sensitivity, BE-NIM can be readily applied to a wide variety of nanoscale devices and materials that are inaccessible with NIM. As an illustration of its broad applicability, BE-NIM was used to characterize AC charge transport in a nanocomposite material loaded below its percolation threshold. In particular, a 100 nm thick multiwalled carbon nanotube (MWNT)/poly(m-phenylenevinylene-co-2,5-dioctyloxy-p-phenylene-vinylene) (PmPV) nanocomposite film was deposited on a gold electrode according to a previously reported literature procedure. Although macroscopic AC charge transport measurements have been performed on this nanocomposite material, nanometer-scale spatially resolved characterization has not yet been reported.

FIG. 3 contains BE-NIM and NIM characterization of a single MWNT embedded in the PmPV matrix. In these measurements, the sample was biased with a 10 kHz AC signal with at 250 mV$_{rms}$ oscillation amplitude. From the BE-NIM current magnitude image (FIG. 3B), a current of ~2.5 pA$_{rms}$ is clearly detectable when the cAFM tip is positioned above the MWNT. In addition, the BE-NIM currentphase image (FIG. 3C) reveals a phase shift of −90° for the MWNT. These values are consistent with expectations for a nanocomposite material loaded well below its percolation threshold where capacitive charge transport dominates.

For comparison, the identical region was imaged with NIM. As was observed with the MOS capacitor test structures, NIM does not possess sufficient sensitivity to resolve nanometer-scale spatial variations in the AC charge transport in this nanocomposite material. Furthermore, the NIM current magnitude and phase images reveal that the contribution to the AC current flow by the fringe capacitance dominates the signal from the MWNT by approximately five orders of magnitude.

Another embodiment of this invention comprises a digital counterpart to the analog version of a BE-NIM system described above, likewise to enable spectroscopic frequency sweeps on a single point determined with 10 nm spatial resolution. Because less equipment required to implement digital bridging, it is of great interest to commercial industry. There are advantages to both implementations, as the analog version enables higher amplification, whereas the digital version requires less hardware to implement, and enables frequency sweeps which is challenging when using analog methods.

Figure 4A:
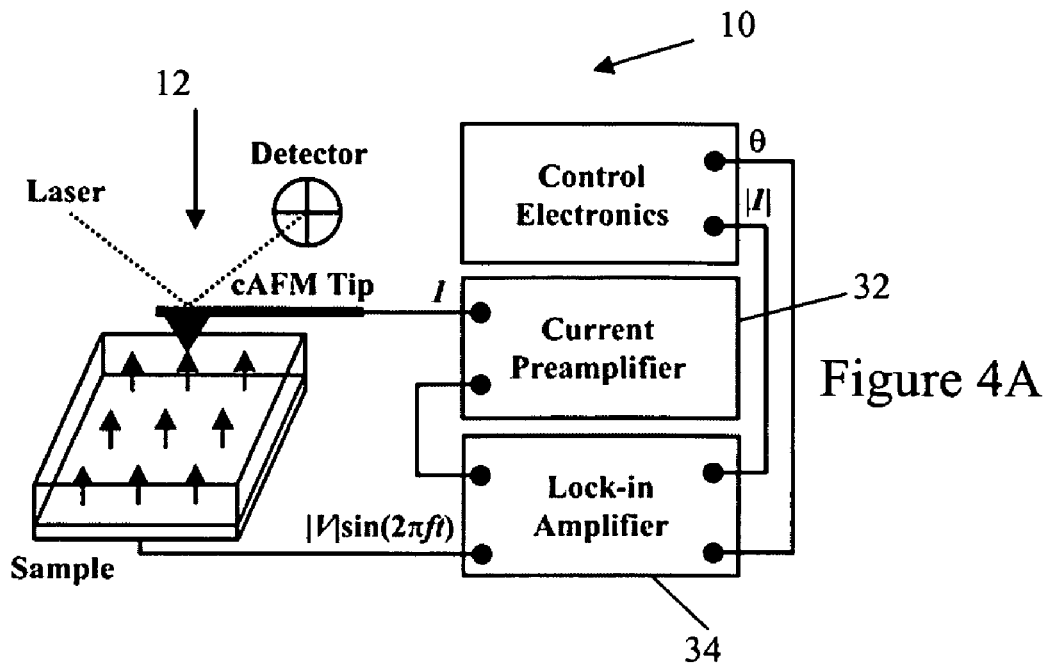
FIGS. 4 A-C. Schematic configuration and circuit diagrams relating to representative embodiments of this invention.
Figure 4B:
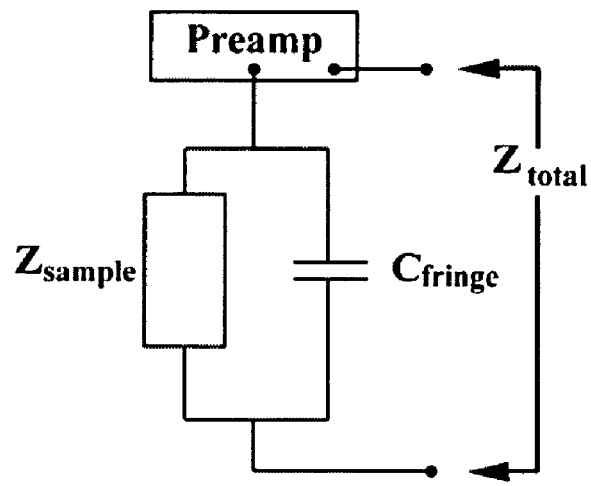
Figure 4C:
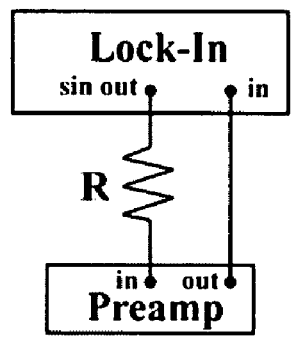

A schematic diagram of a representative component configuration of system 10 is shown in FIG. 4A. Since the bridge is digital, it requires only one current preamplifier 32 and a lock-in amplifier 34. There is no need for a second preamp or analog bridge circuitry. The equivalent circuit diagram for the sample ($Z_{sample}$)/fringe capacitance ($C_{fringe}$) system is illustrated in FIG. 4B. To determine the unknown impedance, first the phase ($\theta_{preamp}$) and current magnitude ($I_{preamp}$) of the preamp response to the frequency range of interest is determined with a 1 MΩ resistor (FIG. 4C). The phase and current magnitude data are subsequently recorded. Secondly, a frequency sweep is performed on the fringe capacitance only, and the phase ($\theta_{fringe}$) and current magnitude ($I_{fringe}$) data are measured. Initially, this can be achieved by removing the sample ($Z_{sample}$, FIG. 4B). In some systems, this is achieved by backing the tip away from the sample 10-100 nm and subsequently performing the frequency sweep. Finally, the total system phase shift ($\theta_{total}$) and current magnitude ($I_{total}$) data are measured, where both the sample and fringe elements contribute to the total system measurement. This is achieved by measuring across the endpoints of FIG. 4B ($Z_{total}$). The preamp response only needs to be measured once for the system, as this remains unchanged from sample to sample. Only the fringe and total system values of phase and current are required for each point of interest.

To determine $Z_{sample}$, first the phase shift and magnitude loss due to the preamp are accounted for, by subtracting the phase loss due to the preamp from $\theta_{fringe}$ and $\theta_{total}$. The gain loss at high frequencies is then corrected for using Equation 1:

$$I_{(total, fringe)}(f) = \frac{I_{preamp}(500)}{I_{preamp}(f)} * I_{m(total, fringe)}(f) \quad \text{Equation 1}$$

where $I_{(total, fringe)}(f)$ is the total or fringe current at a given frequency, $I_{m(total, fringe)}(f)$ is the measured current magnitudes at that frequency, $I_{preamp}(500)$ is the current magnitude from the preamp calibration at 500 Hz, and $I_{preamp}(f)$ is the measured current magnitude form the preamp calibration at the frequency of interest. For purpose of illustration, 500 Hz was chosen as the normalization value to limit the influence of cable inductance at low frequencies, and preamplifier roll-off at higher frequencies.

Once the preamp contributions are corrected for, the complex impedances for the total and fringe elements are calculated with Equation 2:

$$Z_{(total, fringe)}(f) = \frac{V_{RMS}}{I_{(total, fringe)}(f)} * \cos(\theta_{(total, fringe)}(f)) + i * \frac{V_{RMS}}{I_{(total, fringe)}(f)} * \sin(\theta_{(total, fringe)}(f))$$

Equation 2 where $V_{RMS}$ is the root mean squared amplitude of the applied alternating current (AC) voltage, $Z_{(total, fringe)}(f)$ is the complex impedance of the two elements as a function of frequency, and i is the square root of $-1$.

Following the calculation of $Z_{total}$ and $Z_{fringe}$ for each frequency, the sample impedance ($Z_{sample}$) can be determined via Equation 3:

$$Z_{sample}(f) = \frac{Z_{fringe}(f) * Z_{total}(f)}{Z_{fringe}(f) - Z_{total}(f)}$$

Equation 3

Such relationships can be employed in the determination of the sample impedance in a bridge-like fashion without the need for analog circuitry. For instance, such a digital bridge can be used in combination with lift mode type techniques. In a first pass, topography and $Z_{total}$ can be gathered, and in a lift mode pass, a $Z_{fringe}$ image can be gathered. Implementation of the relationships portrayed in Equations 1-3 can then be used to calculate a true impedance image.

To demonstrate the digital implementation of this invention and determine its accuracy, tests were performed on a series of capacitors and resistors of known values. The capacitor was chosen to mimic the value of fringe capacitance (~0.2 nF), and the other test impedances were chosen to mimic typical sample impedances (a 1 MΩ resistor and a 44 pF capacitor in parallel with a 1 MΩ resistor as $Z_{sample}$ in FIG. 4B). For simplicity, these tests were preformed without an AFM, but demonstrate the utility and accuracy of such an embodiment, as would be understood by those skilled in the art.

Figure 5A:
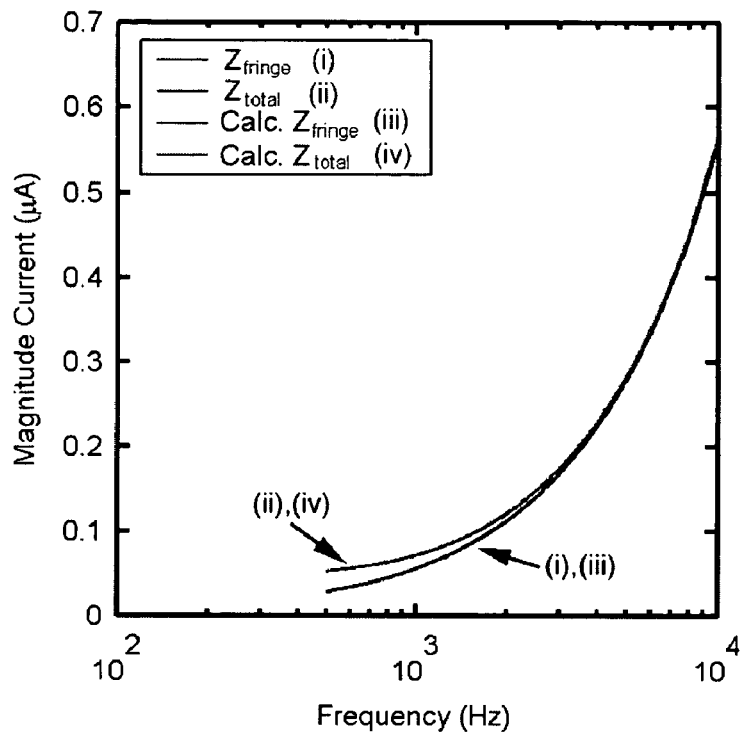
FIGS. 5 A-E. Graphical data representations, in accordance with this invention.
Figure 5B:
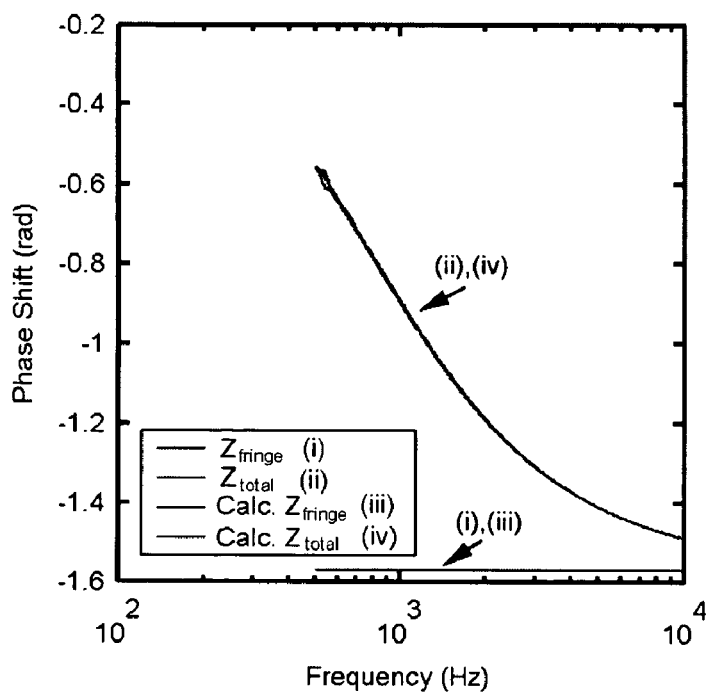
Figure 5C:
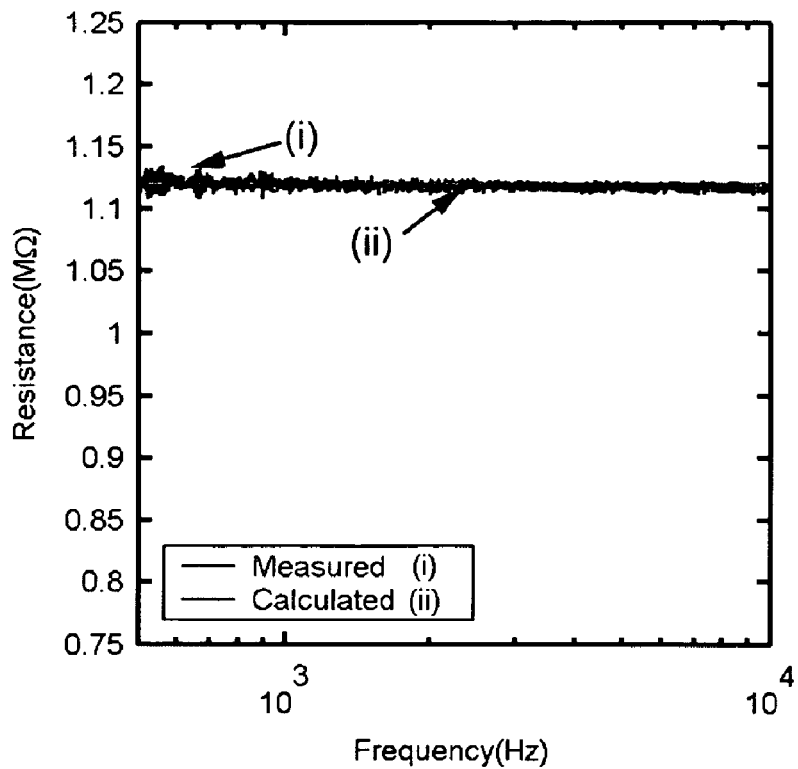
Figure 5D:
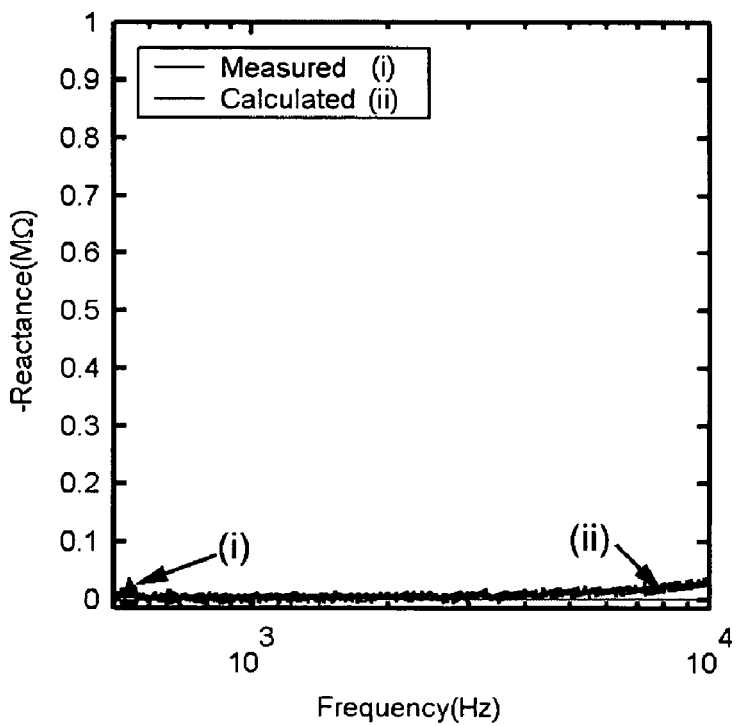
Figure 5E:
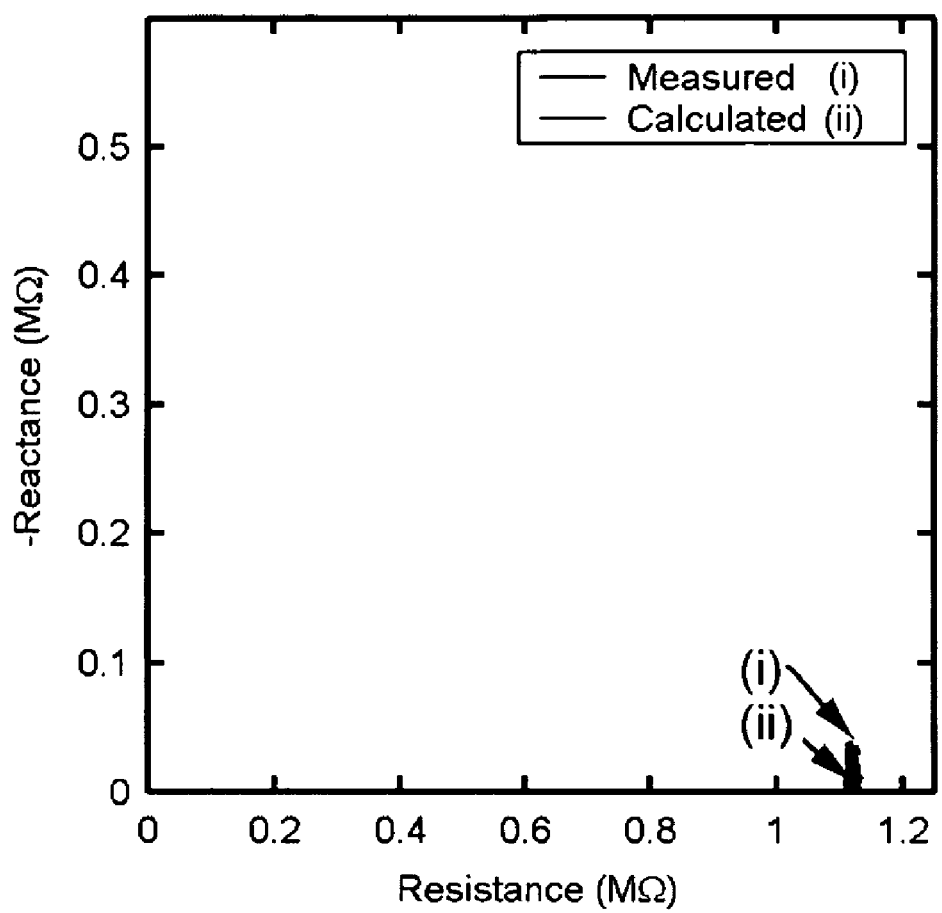

The measured values of the current magnitude (FIG. 5A) and phase shift (FIG. 5B) are shown for the 1 MΩ resistor case (from 500 Hz to $10^4$ Hz). The π/2 phase shift due to the fringe capacitance is clearly visible. The derived values of resistance and reactance for the 1 MΩ resistor as a function of frequency are shown in FIGS. 5C and 5D, respectively, demonstrating that sample impedances can be clearly resolved using this technique, as only the fringe capacitance and the total system impedance were measured directly. As further illustration, the Nyquist Plot is shown in FIG. 5E, showing the frequency independent nature of the resistance.

Figure 6A:
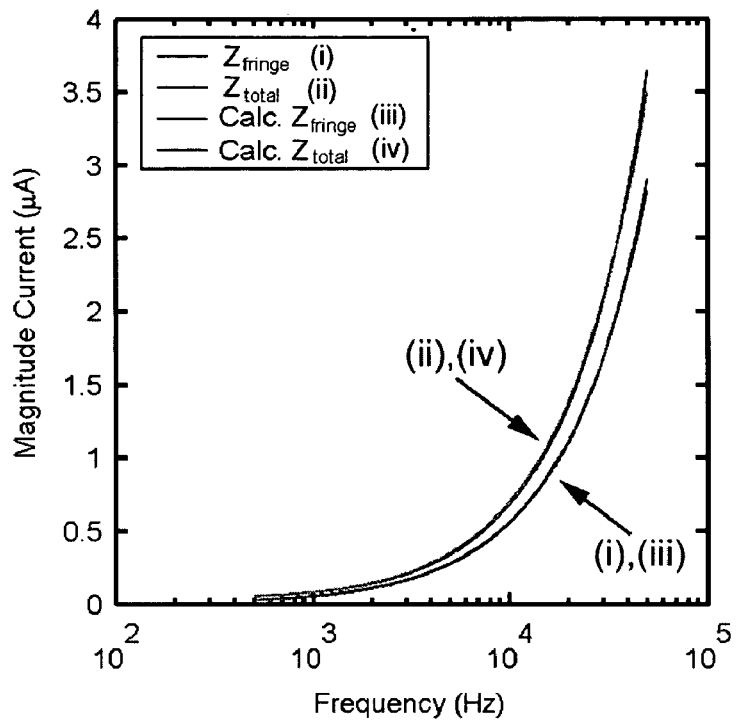
FIGS. 6 A-E. Graphical data representations, in accordance with this invention.
Figure 6B:
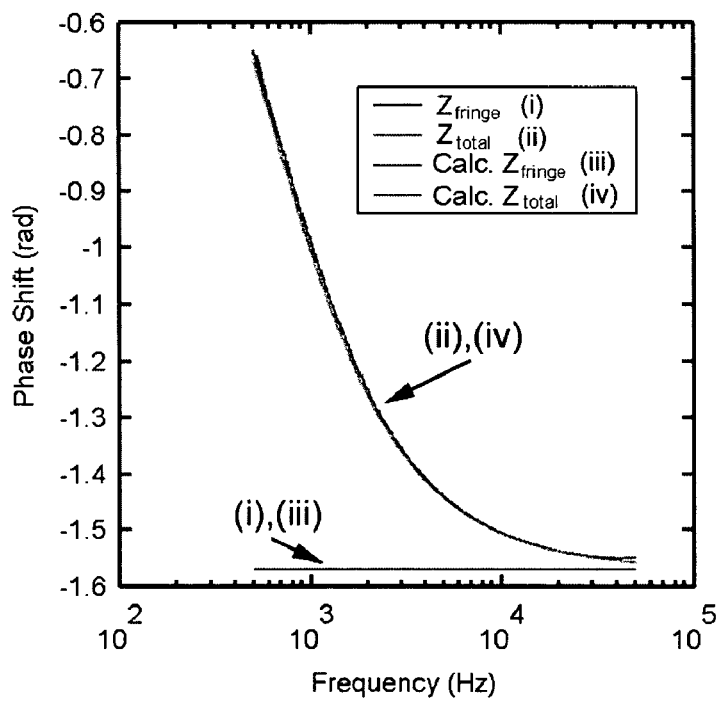
Figure 6C:
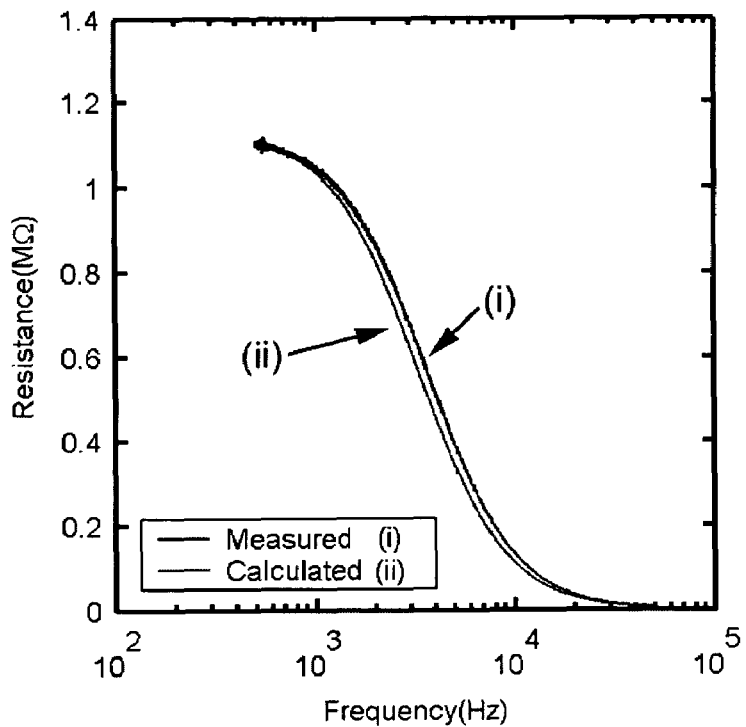
Figure 6D:
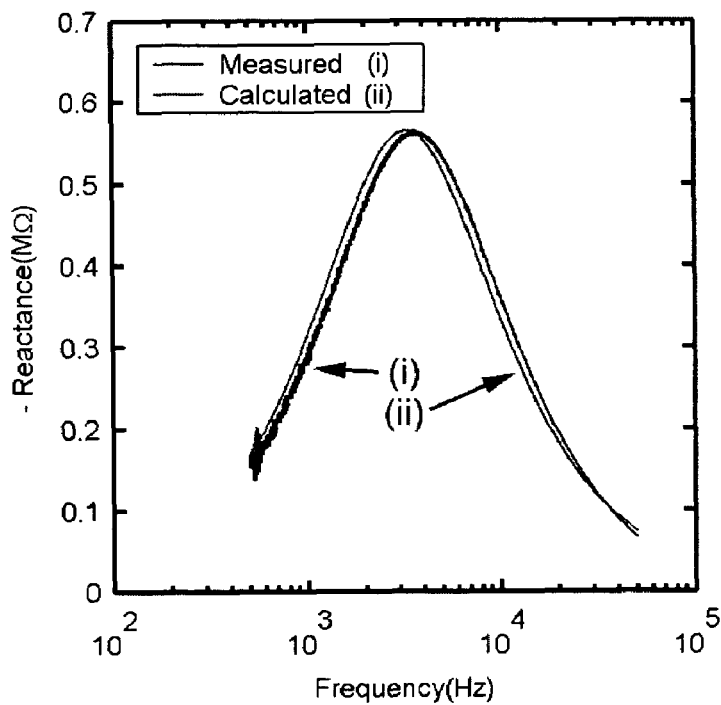
Figure 6E:
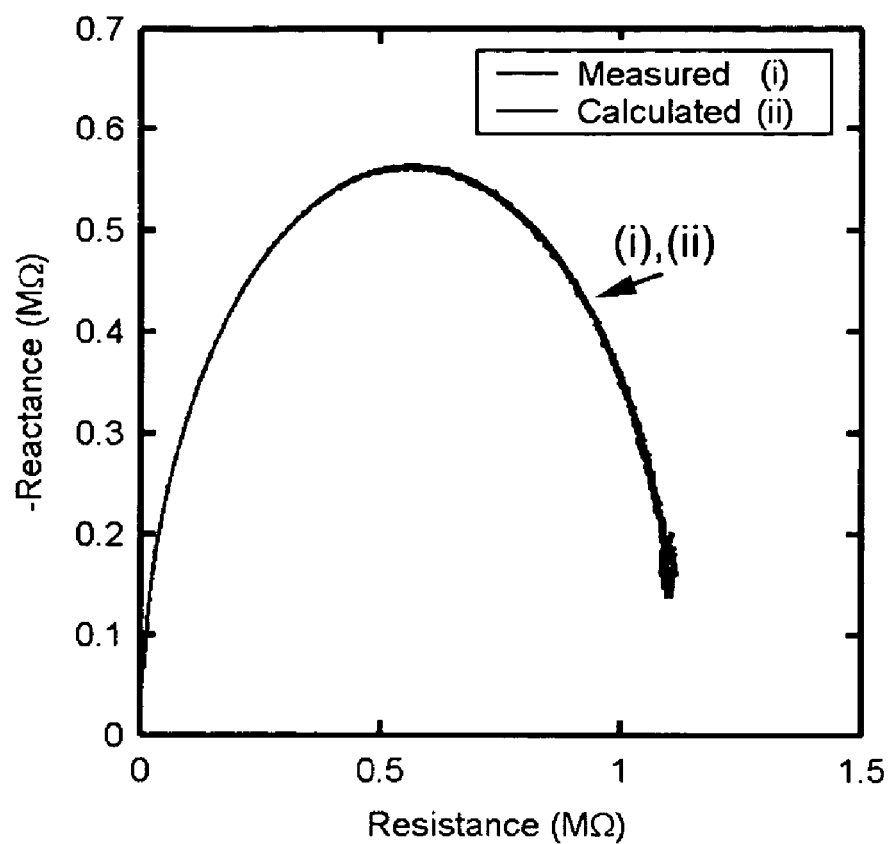

To demonstrate the technique's ability to quantitatively determine values of complex impedances, measurements were performed on a system including an illustrative fringe capacitance and a 44 pF capacitor in parallel with a 1 MΩ resistor (FIG. 4B). The measured current magnitude and phase shift for the fringe capacitance and the whole system are illustrated in FIGS. 6A and 6B, respectively. The derived values of resistance and reactance as a function of frequency are shown in FIGS. 6C and 6D, and are in very good agreement with the calculated values. As an additional proof of accuracy, the Nyquist plot is illustrated in FIG. 6E and again is in excellent agreement with the calculated values.

As demonstrated, analog and digital bridging have been employed to null the spurious contribution to the AC charge transport caused by fringe capacitance in NIM measurements. Using MOS test structures and a MWNT/PmPV nanocomposite material, BE-NIM was shown to quantitatively improve the current magnitude and phase shift sensitivity of this technique by five orders of magnitude while preserving its inherent nanometer-scale spatial resolution. Providing improved sensitivity, the methods and/or apparatus of this invention can be applied to a wide range of nanometer-scale devices and materials that were previously inaccessible with NIM.

We claim:

1. A method for spatially resolving impedance variations, said method comprising:
   providing a conductive atomic force microscope apparatus comprising a probe positionable to contact a sample component;
   digitally bridging an AC bias applied across said sample component to determine impedance of said sample component, said impedance determined as a function of frequency of said applied AC bias, said bridging nullifying the affects of a fringe capacitance contribution to said AC bias across said sample component; and
   correlating said impedance with sample contact position.

2. The method of claim 1 comprising determining current magnitude and phase values of said applied AC bias, and determining current magnitude and phase values of said fringe capacitance contribution to said applied AC bias, said determinations over a frequency range.

3. The method of claim 2 comprising separating said probe from said sample component surface.

4. The method of claim 1 wherein said sample component is topographically mapped.

5. The method of claim 4 wherein current magnitude and phase are mapped simultaneously with said topography.

6. The method of claim 4 wherein capacitance, current magnitude and phase are detected as a function of distance.

7. The method of claim 1 wherein the digital bridge comprises a preamplifier coupled to a lock-in amplifier, said lock-in amplifier applying the AC bias to said sample component.

8. The method of claim 1 wherein said probe is contacted to said sample component during contact mode imaging such that a 10 nm spatial resolution map of impedance variations is provided.

9. A method of using a digital bridge to null the affect of conductive atomic force microscope fringe capacitance contribution to AC current bias across a sample, said method comprising:
   providing a conductive atomic force microscope apparatus comprising a probe positionably contacting a sample component;
   bridging an AC bias applied across said sample component with said digital bridge, with resistance and capacitance sufficient to counter a fringe capacitance about a cantilever tip of said apparatus to determine impedance as a function of frequency of said applied AC bias; and
   correlating said impedance with sample contact position.

10. The method of claim 9 comprising determining current magnitude and phase values of said applied AC bias, and determining current magnitude and phase values of said fringe capacitance contribution to said applied AC bias, said determinations over a frequency range.

11. A nanoscale impedance microscopy system comprising a conductive atomic force microscope apparatus and digital bridge circuitry to null the affect of fringe capacitance about a cantilever tip of said apparatus, said circuitry comprising a frequency-variable bridge circuit comprising at least one current amplifier coupled to a lock-in amplifier.

12. The system of claim 11 wherein said circuitry comprises one current amplifier having an input coupled to said cantilever tip and an output coupled to said lock-in amplifier.

13. The system of claim 11 wherein said lock-in amplifier is coupled to a control component of said atomic force microscope apparatus, to correlate tip location with impedance for spatial mapping of a sample component.

14. A nanoscale impedance microscope apparatus comprising a frequency-variable digital bridge circuit to null the affect of fringe capacitance about a cantilever tip of said apparatus, comprising a circuit comprising at least one current amplifier coupled to a conductive atomic force microscope cantilever tip/sample junction and a lock-in amplifier.

15. The apparatus of claim 14 wherein said digital bridge circuitry comprises a current pre-amplifier component interposed between said cantilever tip and said lock-in amplifier.

16. The apparatus of claim 14 wherein said lock-in amplifier is coupled to an atomic force microscope control component, to correlate tip location with impedance for spatial mapping of a sample component.

17. A method for spatially resolving impedance variations, said method comprising:
    providing a conductive atomic force microscope apparatus comprising a probe positionable to contact a sample component;
    providing a digital bridge circuit across said sample component;
    determining a reference impedance for said bridge circuit;
    applying an AC bias across said sample component to determine sample impedance, said impedance determined as a function of frequency of said applied AC bias; and
    correlating said sample impedance with position of said probe,
    wherein said digital bridge nulls effects of a fringe capacitance contribution to said AC bias across said sample component.

18. The method of claim 17 wherein said impedance reference determination comprises determining current magnitude and phase values of said applied AC bias, and determining current magnitude and phase values of said fringe capacitance contribution to said applied AC bias.

* * * * *

UNITED STATES PATENT AND TRADEMARK OFFICE
CERTIFICATE OF CORRECTION

PATENT NO. : 7,705,617 B1  
APPLICATION NO. : 11/490592  
DATED : April 27, 2010  
INVENTOR(S) : Mark C. Hersam and Liam S. C. Pingree Page 1 of 1

It is certified that error appears in the above-identified patent and that said Letters Patent is hereby corrected as shown below:

Column 1, Lines 7-11:

"The United States Government has certain rights to this invention pursuant to Grant No. NCC 2-1363 from the National Aeronautics and Space Administration, and Grant Nos. DMR-0134706 and CMS-0304472 from the National Science Foundation, to Northwestern University." should be --This invention was made with government support under Grant No. NCC-2-1363 awarded by the National Aeronautics Space Administration (NASA) and Grant Numbers DMR-0134706 and CMS-0304472 awarded by the National Science Foundation. The government has certain rights in the invention.--

Signed and Sealed this

Eighteenth Day of January, 2011

David J. Kappos
*Director of the United States Patent and Trademark Office*